Figure 1:
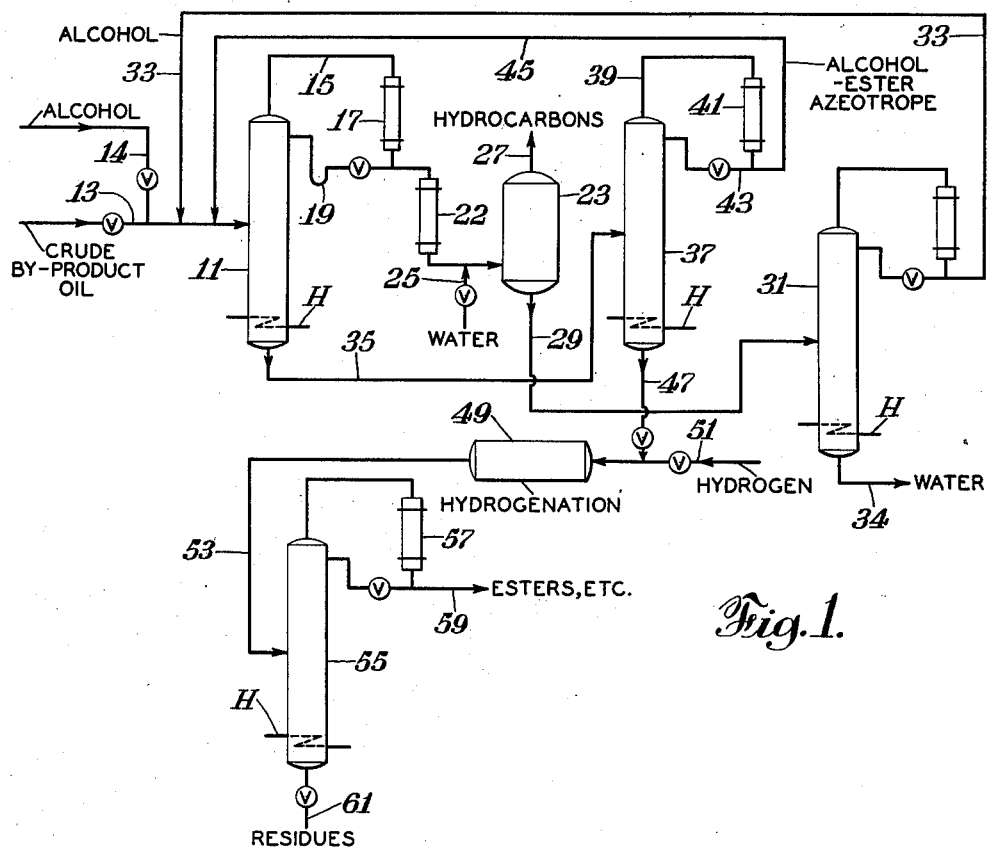

Oct. 10, 1950          J. T. DUNN          2,524,899

PURIFICATION OF FATTY ACID ESTERS

Filed Feb. 8, 1946

INVENTOR
JESSE T. DUNN
BY
*D. C. Harrison*
ATTORNEY

Patented Oct. 10, 1950

2,524,899

UNITED STATES PATENT OFFICE 2,524,899

PURIFICATION OF FATTY ACID ESTERS

Jesse T. Dunn, Charleston, W. Va., assignor, by mesne assignments, to Union Carbide and Carbon Corporation, a corporation of New York Application February 8, 1946, Serial No. 646,489

5 Claims. (Cl. 202—42)

This invention relates to a process of purifying alkyl esters of lower fatty acids containing hydrocarbon and aldehyde impurities; and more especially it concerns the recovery of ethyl acetate of high purity from crude mixtures containing around 50% to 55% or more of ethyl acetate, together with various carbonylic compounds difficultly separable from the ethyl acetate by distillation processes. The invention has especial utility for the recovery of ethyl acetate of 98.5% purity and better from certain by-product oils secured in commercial processes for the production of butadiene from mixtures of ethanol and acetaldehyde.

In processes for producing butadiene, involving the reaction of acetaldehyde and ethanol, wherein the liquid residue from the butadiene separation step is washed with water for the removal therefrom of residual hydrocarbons, and the resultant aqueous solution is distilled to recover the acetaldehyde and ethanol components, the by-product oily layer is distilled to give a fraction commonly containing around 50% to 55% of ethyl acetate, together with large amounts of hydrocarbons, and substantial amounts of ethyl acetal, butyraldehyde and/or methyl ethyl ketone, ethanol and water. The hydrocarbons consist mainly of hexenes and hexadienes. A typical example of such a by-product oil contained 54.3% of ethyl acetate, around 30.3% of such six-carbon hydrocarbons, 7.4% of ethyl acetal, 4.7% of butyraldehyde and methyl ethyl ketone, 2.6% of ethanol and 0.7% of water.

Numerous attempts to extract an ethyl acetate of high purity from the crude by-product oil by means of solvents other than water have been unsuccessful. Extractions thereof with water are complicated by an unfavorable distribution coefficient and by the partial hydrolysis of the ester, whereby considerable quantities of the ester are lost, and serious difficulties arise due to corrosion of apparatus employed.

Heretofore it has been possible by a careful refractionation of the crude ethyl acetate-containing mixture to obtain ethyl acetate having a maximum purity of about 75%, with the recovery of only about one-third of the ethyl acetate present in the crude by-product oil. This results in part from the fact that the hydrocarbons present not only boil close to ethyl acetate but form azeotropes with the latter which complicate the distillation. The following six-carbon hydrocarbons have been identified in the by-product oil: (Ethyl acetate boils at 77.1° C. at atmospheric pressure.)

| Hydrocarbons: | Boiling point, ° C. |
|---|---|
| Hexenes | 60–70 |
| 1,3-hexadiene | 72.9 |
| 3-methyl-1,3-pentadiene | 76–79 |
| Benzene | 80 |
| 1,3-cyclohexadiene | 80.3 |
| 2,4-hexadiene | 82 |

One modification of the present invention is based in important part upon the discovery that if the crude by-product oil or mixture containing the ester is first distilled with a lower saturated aliphatic alcohol such as methanol, ethanol or isopropanol, in amount sufficient to remove substantially all of the hydrocarbons present as low boiling azeotropes with the alcohol, the residue from the distillation contains little or none of the hydrocarbons. Upon hydrogenation of the residue, in either the vapor phase or liquid phase, in the presence of a hydrogenation catalyst, the aldehydes and/or ketones present therein are converted to the corresponding alcohols. The hydrogenation reaction mixture then is fractionally distilled, and ethyl acetate of high purity recovered therefrom, commonly having a purity of 99% or better.

The crude by-product oil or crude mixture containing the fatty acid ester may, if desired, be distilled to a head temperature near but below the boiling point of the ester before the addition thereto of the alcohol. In this manner small amounts of low boiling components may be removed before the distillation with the alcohol, in the interest of economy.

In the distillation with the alcohol of the crude by-product oil or mixture containing the ester, usually just sufficient alcohol is employed to insure the approximately complete removal of the hydrocarbons in the form of hydrocarbon-alcohol azeotropes, thereby avoiding a needless distillation of the ester to remove the last of the alcohol. In the case of a crude ethyl acetate material of the type mentioned above, this amounts to about 33% of the crude ester or 25% of the total charge.

In accordance with one modification of the invention, the crude by-product oil containing the ethyl acetate in admixture with methanol is distilled in a fractionating column. Sufficient methanol is employed to insure removal of approximately all of the hydrocarbons present in the oil in the form of minimum-boiling azeotropic compositions, substantially all of which boil below 58° C. and contain about 35%–40% of methanol. These azeotropes are withdrawn from the column, are condensed, and may be processed for the separation of the components. The methanol therefrom may be utilized in a subsequent distillation of crude ester.

It has been determined that ethyl acetate does not begin to distill until most of the hydrocarbons have been removed. This usually occurs at a temperature around 58° C. As the head temperature in the column reaches a temperature within the range from 58° C. to 62° C., the residual hydrocarbons in the mixture distill in successively smaller amounts, and some of the ester distills over in the form of an azeotropic mixture of ethyl acetate and methanol boiling at 62.1° C. The fractions distilling at a head temperature within the range between 58° C. and 62° C. comprise the mid-cuts, which generally amount to about 10% of the crude mixture charged, depending upon the efficiency of the distillation. These mid-cuts are separately recovered, and may be mixed with another quantity of the crude ester mixture to be refined in a subsequent distillation, thereby assuring good efficiencies for the process.

Following the removal of the hydrocarbons from the crude mixture in the foregoing manner, the liquid residue, or the distilled ethyl acetate obtained by fractional distillation of such residue, if desired, is hydrogenated in vapor phase or liquid phase in the presence of a hydrogenation catalyst such as nickel, platinum black, copper, copper-chromite, nickel chromium alloys, or other well-known hydrogenation catalyst. When using a liquid phase process, temperatures ranging from 50° C. to 200° C., and pressures ranging from 50 pounds to 300 pounds per square inch, gauge, conveniently may be employed. When employing a vapor phase process the liquid residue from the methanol distillation may be vaporized and passed over the hydrogenation catalyst on a suitable support such as Aloxite in a reaction zone maintained at a temperature within the range between 100° C. and 275° C. Temperatures around 180° C. conveniently may be used. The hydrogenation effectively reduces the aldehydes and/or ketones present to the corresponding alcohols. The alcohols thus formed are considerably higher boiling than the aldehydes or ketones and are readily separated in a subsequent distillation.

The reaction mixture from the hydrogenation then is fractionally distilled, preferably at atmospheric pressure, and the ethyl acetate fraction is recovered with a purity of 97% or better, depending upon the efficiency of the fractionating column, and with a recovery thereof above 95%. No aldehyde is present in the distilled ethyl acetate; and the ketonic impurity calculated as methyl ethyl ketone amounts to 0.3% or less, depending upon the conditions of the distillation. The ethyl acetate thus meets commercial specifications for 97%–99% ethyl acetate, or even those for the acetic ether grade when using a highly efficient fractionating column.

The presence of any diethyl acetal in the mixture from the hydrogenation does not complicate the fractional distillation, particularly since water is substantially excluded from the distillation, as the acetal boils 25° C. above ethyl acetate. (Were substantial amounts of water present, a water-acetal azeotrope boiling at 82.6° C. probably would be formed, and moreover some hydrolysis of the acetal might occur in the presence of water.)

It will be understood that ethanol or isopropanol can be substituted for the methanol in the first distillation stage of the process. Each of these higher alcohols forms with hydrocarbons azeotropes which are similar to the methanol-hydrocarbon azeotropes but are higher boiling than the latter.

The following examples of the process are intended solely for purposes of illustration, all quantities being expressed in parts by weight unless otherwise specified:

*Example I*

A crude by-product oily mixture containing 54.3% of ethyl acetate, 30.3% of six-carbon hydrocarbons, 7.4% of diethyl acetal, 4.7% of butyraldehyde and methyl ethyl ketone, 2.6% of ethanol, and 0.7% of water was purified in the following manner:

3,000 parts of the crude mixture were fractionally distilled to a head temperature of 70° C., after which about 1,070 parts of methanol were added to the residual mixture. The latter then was fractionally distilled in a distillation column having about 30 theoretical plates, using a reflux ratio of about 15:1. The major portion of the hydrocarbons was collected in the form of azeotropic mixtures with methanol which were free from ethyl acetate. These mixtures amounted to about 40%–45% of the total charge. After the head temperature passed 58° C., some ethyl acetate began to distill, and mid-cuts were collected which contained increasingly larger amounts of ethyl acetate and smaller amounts of hydrocarbons.

At a temperature of about 62.1° C. the azeotrope of ethyl acetate and methanol distilled over as a mid-cut and was separately recovered. The ester present in this azeotrope may be completely recovered by adding these mid-cuts, which amount to about 10% or less of the crude by-product oil, to a fresh quantity of the crude oil subsequently to be refined.

The fraction containing the major part of the ethyl acetate, and boiling above 62.1° C. at atmospheric pressure, was hydrogenated in the liquid phase for sixteen hours at a temperature of from 80° C.–100° C., and a hydrogen pressure of 150 pounds per square inch, gauge, in the presence of 1% by weight of a Raney nickel catalyst. By the hydrogenation the aldehyde and ketonic components of the residue from the methanol distillation were reduced from 4.4% to only 0.1%.

The hydrogenation reaction mixture then was fractionally distilled, and some methanol and a small amount of saturated hydrocarbons were withdrawn and collected as a heads fraction boiling up to 62° C. The ethyl acetate then was distilled overhead and recovered in a purity of about 99.3%, as a fraction boiling at about 76.5° C.–77.1° C., free from hexenes and containing slightly less than 0.1% of carbonylic compounds. In the final distillation a reflux ratio of 10:1 provides good results.

The hydrogenation may be conducted in the vapor phase if desired. Thus, a fraction of a crude by-product oil, which fraction boiled at 68° C.–70° C., and contained about 17% of butyraldehyde and methyl ethyl ketone, and about 5% of unsaturated hydrocarbons, was vaporized and fed at the rate corresponding to 50 cc. of the liquid per hour together with 48 liters of hydrogen per hour over 300 cc. of a reduced nickel-chromium catalyst supported on "Aloxite" maintained at a temperature of 180° C. The time of contact of the vapors with the catalyst was about 12 seconds. The vaporous reaction products then were condensed. The combined aldehyde and ketonic component of the mixture was reduced from 17.3% to 0.7%.

Example II

Under the conditions set forth in Example I but utilizing a dephlegmating column having only about 8 theoretical plates, ethyl acetate of 97.5%–98.5% purity was secured which in other respects passed the specifications for acetic ether grade ester. About 3% of the ethyl acetate distilled over with the methanol-hydrocarbon azeotropes. This decreased somewhat the amount of ethyl acetate recovered in the process. The mid-cuts from the methanol distillation were slightly larger than in Example I, amounting to about 12% of the total charge, and the purity of the refined ethyl acetate was somewhat lower, about 97.6%. In this example a reflux ratio of 10:1 was employed during the separation of the methanol-hydrocarbon azeotrope head cuts at temperatures up to 60° C.; and a reflux ratio of 15:1 was used to separate the last of the mid-cuts from the residue containing ethyl acetate. The mid-fractions were collected over a head temperature range of from 60° to 66° C., after which the distillation was discontinued.

The residue from this distillation then was hydrogenated in a three-liter stainless steel bomb, using 3% of Raney nickel catalyst. 1,845 parts of the residue were heated at 150° C. for 26 hours under a hydrogen pressure of 150 pounds per square inch, gauge. The hydrogenated mixture was distilled in a fractionating column, using a reflux ratio of 10:1, and the purified ethyl acetate was separately recovered, after the removal of head cuts containing some methanol, water and saturated hydrocarbons.

It is preferred to use methanol in the first distillation stage of the process, since ethanol and isopropanol form with the hydrocarbons present azeotropes which are higher boiling than those formed with methanol, and such alcohols are not so readily separated from the ester.

By the practice of the present invention it is possible to utilize for the first time for the production of ethyl acetate of high purity crude mixtures of by-product oils from butadiene production. Heretofore, these mixtures, because of the presence therein of large amounts of unsaturated hydrocarbons and carbonylic compounds boiling close to the boiling point of the ethyl acetate, were not suitable for the production of ethyl acetate of sufficiently high purity to meet standard commercial specifications for this ester.

While for convenience the invention has been described in connection with operations of the batch type, it will be understood that the process readily may be conducted in a continuous manner. Thus, the crude by-product oil containing the ethyl acetate may be mixed with methanol and introduced into the mid-portion of a reflux column, operating at a head temperature of around 54° C.–60° C., and the methanol-hydrocarbon azeotrope may be continuously withdrawn, condensed, and the condensate washed with approximately twice its volume of water and passed to a separator where, after stratification, the hydrocarbon layer is withdrawn, and the methanol is separately withdrawn and passed to a methanol recovery still. The methanol then can be reused in the process.

The liquid residue from the lower portion of the first column may be introduced continuously into a mid-portion of a second column still, preferably operating at a reflux ratio of 15:1, and at a head temperature of about 66° C. The vaporized mid-cuts containing some ethyl acetate, methanol and small amounts of hydrocarbons may be condensed in a reflux condenser and selected portions thereof returned to the first still together with additional crude by-product oil and methanol. The residue from the second still may be continuously withdrawn, and may be hydrogenated, either continuously in the vapor phase, or intermittently in either the vapor phase or liquid phase. The resultant reaction mixture then may be fractionally distilled in a distillation column so operated as to provide a fraction boiling between about 76.5° C. and 77.1° C., which is separately recovered and contains ethyl acetate of high purity.

Figure 2:
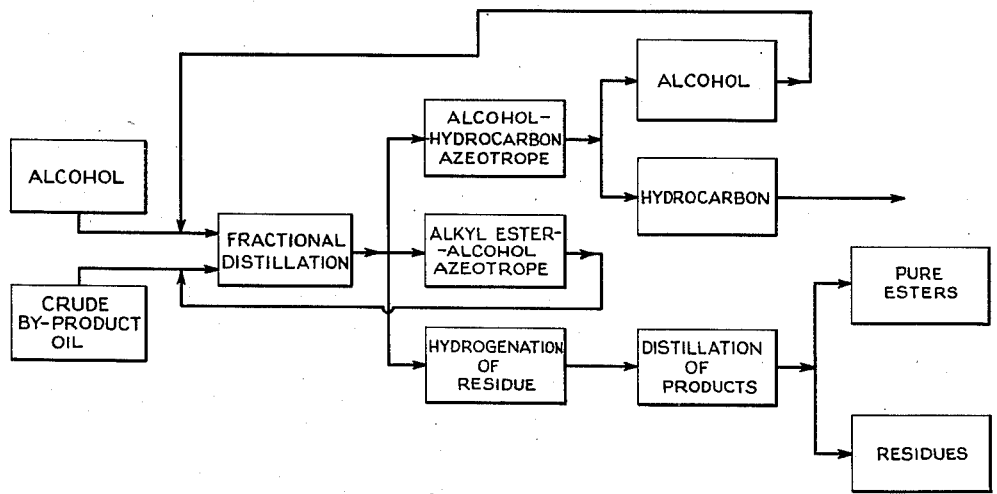

In the accompanying drawing Fig. 1 illustrates diagrammatically one form of apparatus for performing the process in a continuous or a semi-continuous manner; and Fig. 2 represents a flow diagram of a form of the invention. In the drawing numeral 11 designates a column still into a mid-portion of which a mixture of the crude by-product oil and alcohol is introduced through valve-controlled lines 13 and 14. A vapor outlet line 15 leads from the head of the column 11 to a reflux condenser 17, from whence a selected amount of reflux liquid returns to the column through valve-controlled line 19. The remainder flows through line 21 through a cooler 22 to a separator 23 where it is washed with water entering line 21 through valve-controlled water line 25. After stratification of the liquids in separator 23 the hydrocarbon layer is withdrawn through line 27, and the alcohol layer is separately withdrawn and flows through line 29 to an alcohol recovery still 31 where it is vaporized and returned through line 33 to column 11. Water is withdrawn from still 31 through conduit 34.

The liquid residue from the lower part of column 11 flows through line 35 to the mid-portion of a second column still 37, the vapor outlet line 39 of which has therein a reflux condenser 41. The outlet from the latter is connected with still 37 through valve-controlled reflux line 43, and with column 11 through lines 45 and 13. The residue from still 37 containing the alkyl ester is withdrawn, either intermittently or continuously through valve-controlled line 47 and is introduced into a hydrogenation vessel 49, together with hydrogen flowing through valve-controlled line 51. The hydrogenation reaction mixture is conducted from vessel 49 through a conduit 53 to the mid-portion of a distillation column 55 which is provided with a reflux condenser 57, and means for returning a selected amount of condensate to the column 55 as reflux. The remainder of the condensate is withdrawn to storage through line 59. When column 55 is used as a batch still, a heads fraction containing some alcohol and a small amount of hydrocarbons is withdrawn through line 59, after which an alkyl ester fraction of high purity is distilled overhead and recovered. When column 55 functions as a continuous still it serves as a forecolumn, and the condensate is conducted through line 59 to a refining still (not shown) for removal of the alcohol and hydrocarbons from the alkyl ester. Hydrogen flowing from vessel 49 can be recycled in the process is well-known manner. Residue from column 55 is withdrawn through conduit 61. The kettles of the column stills 11, 31, 35 and 37, are provided with suitable means H for supplying the required amount of heat; and vessel 49 is provided with suitable heating means (not shown).

While the invention has been specifically exemplified in connection with the recovery of relatively pure ethyl acetate from crude mixtures containing the same, it will be evident that the invention is not limited to that modification thereof, and can be utilized for the recovery of other pure alkyl esters of lower fatty acids from mixtures thereof with hydrocarbons and/or carbonylic compounds boiling within the same narrow boiling range. Thus, relatively pure propyl acetate may be recovered from mixtures containing it together with n-heptenes, 1,3-heptadiene, 2,4-heptadiene, methyl propyl ketone and valeraldehyde by distillation of the crude mixture admixed with ethanol in amount sufficient to form azeotropic mixtures with the total hydrocarbons present, fractional distillation of the resultant mixture to eliminate such azeotropes, hydrogenation of the residual liquid, fractional distillation of the hydrogenation reaction mixture, and separate recovery of the purified propyl acetate.

It will be evident that many widely different embodiments of this invention may be made without departing from the spirit thereof, and that the invention is susceptible of modification within the scope of the appended claims.

I claim:

1. Process for purifying crude ethyl acetate which is contaminated with unsaturated hydrocarbons and carbonylic compounds, said hydrocarbons forming with said ethyl acetate azeotropic mixtures boiling at temperatures below the boiling point of ethyl acetate, which comprises adding thereto a saturated monohydric aliphatic alcohol having from one to three carbon atoms in the molecule in amount sufficient to form azeotropic mixtures with approximately all of the hydrocarbons present therein, distilling the resultant mixture and removing overhead the alcohol-hydrocarbon azeotropes, separately removing overhead residual alcohol as the alcohol-ethyl acetate azeotrope, hydrogenating the residue from such distillation at an elevated temperature within the range between about 50° C. and about 275° C. in the presence of a hydrogenation catalyst, distilling the hydrogenation reaction mixture, and separately recovering the fraction containing ethyl acetate of high purity and substantially free from hydrocarbons and carbonylic compounds.

2. Process for purifying crude ethyl acetate which is contaminated with unsaturated hydrocarbons and carbonylic compounds, said hydrocarbons forming with said ethyl acetate azeotropic mixtures boiling at temperatures below the boiling point of ethyl acetate, which comprises adding thereto methanol in amount sufficient to form azeotropic mixtures with approximately all of the hydrocarbons present therein, distilling the resultant mixture and removing overhead methanol-hydrocarbon azeotropes, separately removing overhead residual methanol as the methanol-ethyl acetate azeotrope, hydrogenating the residue from such distillation at an elevated temperature within the range between about 50° C. and about 275° C. in the presence of a hydrogenation catalyst, distilling the reaction mixture from the hydrogenation, and separately recovering the fraction containing ethyl acetate in a high purity of at least 97.5% and substantially free from hydrocarbons and carbonylic compounds.

3. Process for recovering ethyl acetate of at least 98.5% purity from a crude mixture containing ethyl acetate, together with unsaturated hydrocarbons, butyraldehyde or methyl ethyl ketone, ethyl acetal and ethanol, the said hydrocarbons forming with ethyl acetate azeotropic mixtures boiling at temperatures below the boiling point of ethyl acetate, which comprises mixing methanol with said mixture in amount sufficient to form minimum boiling azeotropic compositions with the said hydrocarbons present, distilling such mixture and separately removing as distillate the methanol-hydrocarbon azeotropes, removing further methanol in the form of the methanol-ethyl acetate azeotrope, hydrogenating the distillation residue at an elevated temperature within the range between 50° C. and 275° C. in the presence of a hydrogenation catalyst, fractionally distilling the reaction mixture from the hydrogenation, and separately recovering the fraction containing ethyl acetate having a purity of at least 98.5%, and which is substantially free from hydrocarbons and aldehydes and contains not more than around 0.3% of methyl ethyl ketone.

4. Process for purifying crude ethyl acetate which is contaminated with unsaturated hydrocarbons and carbonylic compounds, said hydrocarbons forming with said ethyl acetate azeotropic mixtures boiling at temperatures below the boiling point of ethyl acetate, which comprises distilling the said crude mixture, removing the fraction boiling below about 70° C., thereafter mixing methanol with the liquid residue in amount at least sufficient to form with approximately all of the hydrocarbons present minimum boiling azeotropic compositions, distilling the resultant mixture at head temperatures up to 62.1° C., removing as distillate the methanol-hydrocarbon azeotropes, and removing further methanol in the form of the methanol-ethyl acetate azeotrope, hydrogenating the distillation residue at an elevated temperature within the range between 50° C. and 275° C. in the presence of a hydrogenation catalyst, thereby converting any unsaturated hydrocarbons to saturated hydrocarbons, and any ketones and aldehydes to the corresponding alcohols, fractionally distilling the hydrogenation reaction mixture, and separately removing overhead and recovering a fraction boiling at about 76.5° C.–77.1° C. containing ethyl acetate substantially free from aldehydes and hydrocarbons and having a purity of at least 99%.

5. Process for purifying an alkyl ester of acetic acid having up to three carbon atoms in the alkyl group and that is contaminated with unsaturated hydrocarbons and carbonylic compounds, forms minimum boiling azeotropic mixtures with said hydrocarbons, and forms another higher boiling azeotropic mixture with a saturated aliphatic lower monohydric alcohol, which comprises mixing therewith such a saturated aliphatic lower monohydric alcohol forming minimum boiling azeotropic mixtures with said hydrocarbons, said alcohol being in amount sufficient to form such azeotropic mixtures with substantially all of the hydrocarbons present therein, distilling the resultant mixture and removing overhead the hydrocarbons in the form of alcohol-hydrocarbon azeotropes while preventing distillation of the major portion of said ester, hydrogenating the liquid residue from such distillation at an elevated temperature in the presence of a hydrogenation catalyst, thereafter fractionally distilling the reaction mixture from the hydrogenation, and recovering said alkyl ester of acetic acid in high purity and substantially free from hydrocarbons and carbonylic compounds.

JESSE T. DUNN.

REFERENCES CITED

The following references are of record in the file of this patent:

UNITED STATES PATENTS

| Number | Name | Date |
|---|---|---|
| 2,043,688 | Woodhouse | June 9, 1936 |
| 2,105,826 | Tartaron | Jan. 18, 1938 |
| 2,206,310 | Swallen | July 2, 1940 |
| 2,341,433 | Fisher | Feb. 8, 1944 |
| 2,376,870 | Engel | May 29, 1945 |
| 2,395,057 | Marsh et al. | Feb. 19, 1946 |